United States Patent [19]
Muller et al.

[11] 4,424,612
[45] Jan. 10, 1984

[54] FASTENING PLATE FOR SECURING A SNAP PIN TO AN AUTOMOBILE DOOR PANEL

[75] Inventors: Klaus Muller, Weil-Haltingen; Leon Tancer, Lorrach, both of Fed. Rep. of Germany

[73] Assignee: A. Raymond, Lorrach, Fed. Rep. of Germany

[21] Appl. No.: 258,585

[22] Filed: Apr. 29, 1981

[30] Foreign Application Priority Data

May 16, 1980 [DE] Fed. Rep. of Germany ... 8013284[U]

[51] Int. Cl.³ .............................................. A44B 17/00
[52] U.S. Cl. ......................................... 24/669; 24/289
[58] Field of Search .................................. 24/289–297, 24/265 A, 326, 336, 362, 340, 205.16 R, 339, 341, 361, 205.18, 201 R, 230 AK, 350-355, 224 R; 52/717, 718, 511

[56] References Cited

U.S. PATENT DOCUMENTS 1,268,349  6/1918  Hecht ................................. 24/224 R
1,423,590  7/1922  Zimmerman ...................... 24/224 R

FOREIGN PATENT DOCUMENTS 25002     6/1913  Fed. Rep. of Germany .... 24/224 R
1119996   7/1968  United Kingdom .................. 24/295
426086   10/1970  U.S.S.R. ............................ 24/224 R Primary Examiner—Gene Mancene
Assistant Examiner—John G. Weiss
Attorney, Agent, or Firm—Finnegan, Henderson, Farabow, Garrett & Dunner

[57] ABSTRACT

A fastening plate for securing door-panel snap pins to an automobile's body to fix the interior panel to the automobile door. The fastening plate includes an aperture for slideably receiving a snap pin and a resilient rest plate positioned under the aperture for pressing the head of the snap pin against the portion of the holding plate surrounding the aperture. The resultant fastening plate securedly holds the snap pin perpendicular while permitting the radial movement of the snap pin within the clearance between the neck of the snap pin and the aperture.

8 Claims, 11 Drawing Figures

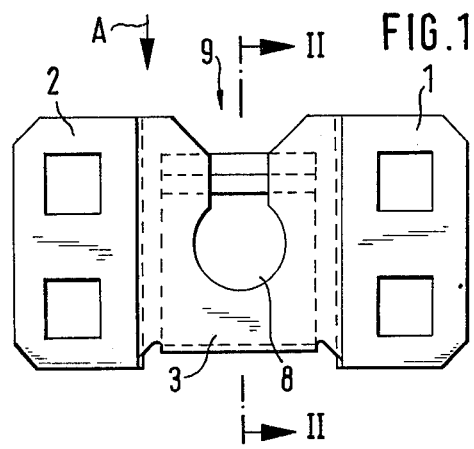
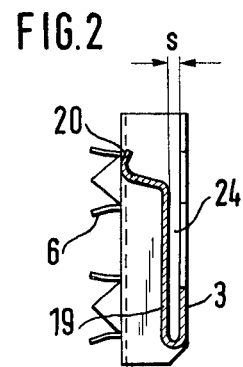
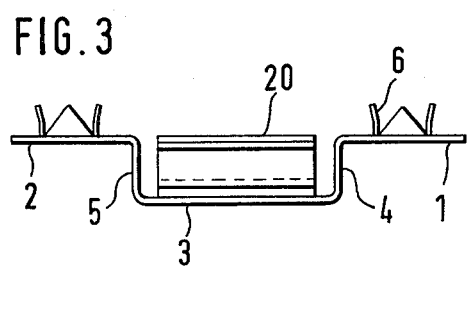
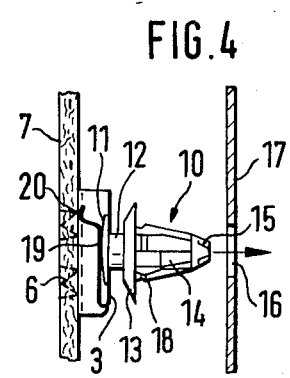
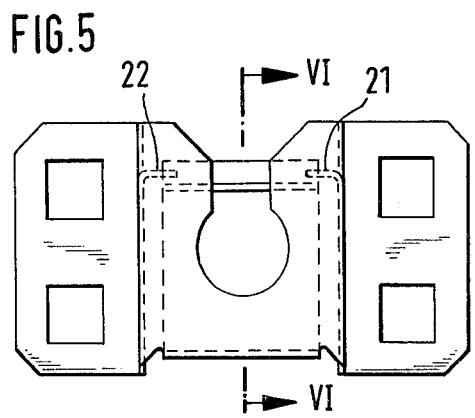
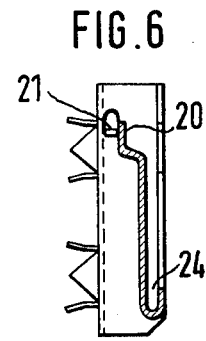

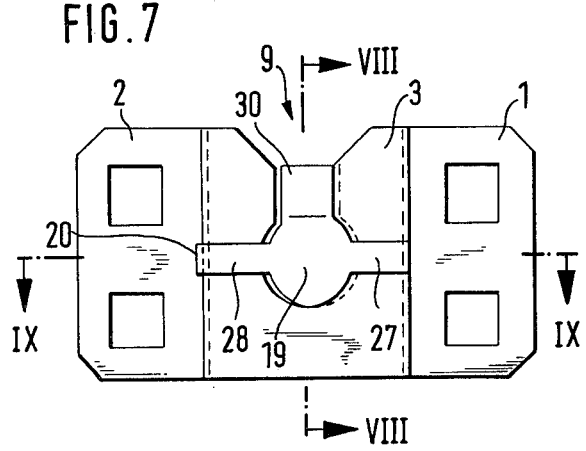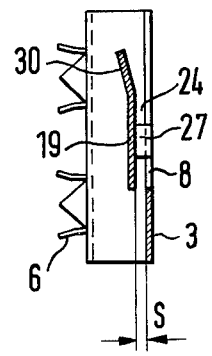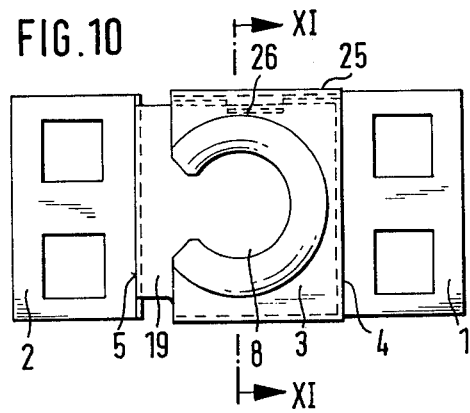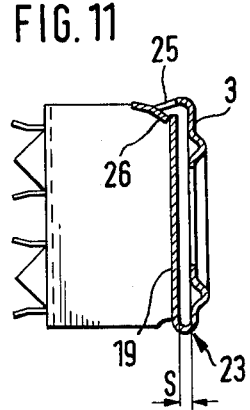

FASTENING PLATE FOR SECURING A SNAP PIN TO AN AUTOMOBILE DOOR PANEL

BACKGROUND OF THE INVENTION

1. Field of the Invention

The present invention relates to a fastening plate for securing door-panel snap pins to an automobile's interior door and side panels, which are normally made of hard fiber materials. The snap pins can then be inserted into holes in an automobile's body to fix the interior panel to the body. The fastening plate includes a holding plate offset above the door panel and provided with a keyhole shaped aperture or clearance opened on one side for the introduction of the neck portion of a door panel snap pin. The fastening plate also includes a pair of support plates positioned on opposite sides of the holding plate and connected to the holding plate by two side walls. The support plates include several claws stamped out of the support plate and bent at about right angles to the support plate in order to anchor the fastening plate to the door panel.

2. Description of the Prior Art

Door panel snap pins have been used to fix cloth-covered or laminated interior automobile panels to the automobile's body wall or inside door wall. Such a snap pin is provided at one end with a thin head and a neck which are ordinarily inserted into a tapered keyhole formed in an interior panel to thereby anchor the snap pin within the tapered hole area. A circular support and sealing surface is located at the end of the snap pin's neck opposite the head. Beyond the circular support are several conically converging elastic legs which can be pressed into corresponding holes in an automobile's body or door wall. The elastic legs include projecting edges which reach behind the rim of the hole and thus securely anchor the snap pin, and therefore the panel, to the body wall.

Instead of providing the cardboard lining of the panels with keyhole shaped apertures, it has been found advantageous on a variety of grounds to use fastening plates which include claws or cramps that can deeply burrow into the fibers of the door panel and secure the plate to the panel. Normally the diameter of the circular clearance in such fastening plates is significantly larger than the neck diameter of the snap pin. This arrangement allows the snap pin to slide radially when the tip of the snap pin is introduced into the fastening hole. Therefore, the snap pin can align with the fastening hole without being displaced from the fastening plate.

It has been found that fastening plates are particularly useful when the spacing between the interior panel and the body wall varies at different fastening sights. In some circumstances, the height of a fastening plate above the cardboard will also vary with that spacing. In other instances, the length of a snap pin's neck will be dimensioned to match the thickness of a panel's cardboard base. In most cases, the fastening plate is substantially thinner than the base of a panel. Thus, if it is desired to hold the same or similar snap pins with a fastening plate, rather than with holes in the panel's base, the snap pin will normally have too much play at the aperture in the fastening plate and because of its weight will tilt downward. This downward tilting makes it difficult to align the tips of the snap pin into the holes in the automobile's body or door walls.

SUMMARY OF THE INVENTION

In view of the above problems associated with fastening plates now on the market, it is the object of the invention to provide fastening plates in which the inserted door panel snap pins are held secure against tilting and nevertheless are easily displaceable in a lateral direction parallel to the panel. These plates facilitate the introduction of the elastic legs of the snap pin into the fastening holes in the body wall.

It is a further object to provide a fastening plate which can economically be made from readily available materials, such as sheet metal.

The problems presented by previous fastening plates are solved by the immediate invention by providing a fastening plate which includes a support plate for resting against a panel, a holding plate with a keyhole shaped aperture, and resilient rest plate shaped from the same sheet metal as the fastening plate's holding plate. The rest plate is mounted at a level between the level of the holding plate and the level of the support plates. The rest plate is positioned directly under the aperture in the holding plate and forms a pouch with a gap between the rest plate and the holding plate which is slightly less in thickness than the thickness of the head of a door panel snap pin.

In one embodiment of the invention, the free end of the rest plate is pulled down from the holding plate as far as the level of the two support plates and is then bent back again slightly toward the holding plate. This design assures that the snap pin's head will be pressed against the holding plate by the resilient rest plate. Thus, even after the installation of the fastening plate on the panel, the snap pin will be securely held and yet will be able to make the necessary radial or lateral displacement to ensure the proper insertion and alignment of the snap pin.

Additional objects and advantages of the invention will be set forth in part in the description which follows, and in part will be obvious from the description, or may be learned by practice of the invention. The objects and advantages of the invention will be realized and obtained by means of the instruments and combinations particularly pointed out in the appended claims.

To achieve the objects and in accordance with the purpose of the invention, as embodied and broadly described herein, the invention comprises a fastening plate for securing to a panel a removable snap pin which includes a head and adjoining neck, the head of the snap pin having a rear face, a circumferential wall, and a circumferential shoulder integral with the snap pin's neck, comprising a support plate for attachment to the panel, a holding plate offset from said support plate, said holding plate including an aperture larger in diameter than the neck of the snap pin and smaller in diameter than the head of the snap pin, said aperture including an opening on one side for slideably accepting the neck of the snap pin, and clamp means for resiliently pressing the shoulder of the snap pin against the portions of the holding plate surrounding said aperture to thereby securely hold the snap pin perpendicular to the support plate while permitting the radial movement of the snap pin within the clearance between the neck of the snap pin and the aperture.

It is to be understood that both the foregoing general description and the following detailed description are exemplary and explanatory only and are not restrictive of the invention, as claimed.

The accompanying drawings, which are incorporated in and constitute a part of the specification, illustrate several embodiments of the invention and together with the description serve to explain the principles of the invention.

BRIEF DESCRIPTION OF THE DRAWINGS

FIG. 1 is a top view of one embodiment of the present invention.

FIG. 2 is a section view of the embodiment shown in FIG. 1, the section view being taken along line 2—2.

FIG. 3 is a front view of the embodiment shown in FIG. 1, the front view being taken in the direction A shown in FIG. 1.

FIG. 4 is an assembly view of the embodiment shown in FIG. 1 attached to a panel and holding a snap pin for insertion into a wall.

FIG. 5 is a top view of another embodiment of the fastening plate of the present invention.

FIG. 6 is a section view of the embodiment of FIG. 5, the section views being taken along line 6—6.

FIG. 7 is a top view of a third embodiment of the present invention.

FIG. 8 is a section view of the embodiment shown in FIG. 7, the view being taken along line 8—8.

FIG. 9 is a longitudinal section of the embodiment shown in FIG. 7, the view being taken along line 9—9.

FIG. 10 is a top view of a fourth embodiment of the invention.

FIG. 11 is a cross-section of the fourth embodiment shown in FIG. 10, the view being taken along line 11—11.

DESCRIPTION OF THE PREFERRED EMBODIMENTS

Reference will now be made in detail to the present preferred embodiments of the invention, examples of which are illustrated in the accompanying drawings.

The fastening plate shown in FIG. 1 is preferably stamped from a single sheet metal strip. In its final condition, the fastening plate consists of two support plates 1 and 2, a holding plate 3, and two side walls 4 and 5 which brace or position the holding plate 3 at a desired spacing above the support plates 1 and 2. The support plates 1 and 2 are provided with several claws or cramps 6 (in this instance with 8 claws to each shoulder) which are stamped out of the plate and bent so as to be approximately at right angles to the fastening side. In use, the claws 6 are pressed into a hard fiber cover panel 7 (shown in FIG. 4), or a panel of a similar material, thereby anchoring the fastening plate to the panel.

The holding plate 3 rising above the support plates 1 and 2 is provided with a keyhole shaped clearance or aperture 8 which includes a funnel-shaped opening 9 on one side of the aperture 8. The purpose of aperture 8 is to seat the head of a plastic door panel snap pin. Snap pins are well-known and are not an object of the invention. For the sake of better understanding the problem of fastening a snap pin to a panel, a typical snap pin will nevertheless be described below.

The snap pin 10 consists of a head 11, a neck 12, a circular rest guard 13, and several adjoining compressible elastic legs 14. The legs 14 initially diverge from the guard rest 13 in a slightly conical manner as far as rim 18 and then converge again at an acute angle into a common tip 15. In use, the tip 15 of the door panel snap pin 10 is initially introduced into a fastening hole 16 of a body wall 17 and then pressed forward until the rest guard 13 rests against the body wall 17. During this process, the rim or projection edges 18 of the snap pin 10 will be compressed as the elastic legs 14 are introduced into the hole 16, and thereafter, will spring apart behind the body wall 17 so that the snap pin 10 will be anchored after the elastic legs 14 are snapped into the fastening hole 16 of the body wall. The neck 12 of the door panel 10 has enough play with respect to the aperture 8 of the holding plate 3 that when the snap pin 10 is forced into the body wall 17, it can move radially and align itself with the position of the fastening holes 16.

Because the neck 12 of snap pin 10 will ordinarily be longer than the thickness of the holding plate 3, an extended sheet metal part is mounted on the side of the holding surface which is opposite the outer face of the holding surface 3. The sheet metal part acts as a rest plate 19 which is bent underneath the holding surface to form with the holding plate 3 a pouch 24 which will tightly hold the head 11 of the snap pin 10 against the holding plate 3. However, the rest plate 19 will permit the radial or lateral displacement of the pin 10 to the degree permitted by the clearance between the aperture 8 and the neck 12. The rest plate shown in FIG. 2 is pressed against the underside of the holding surface 3 to form a gap "S" representing the depth of the pouch. This depth is slightly less than the thickness of the head plate 11 of the snap pin 10.

In the embodiment shown in FIGS. 1 through 4, the end 20 of the rest plate 19 is pulled down from the holding plate 3 to the level of the two support plates 1 and 2 and is then bent slightly back toward holding plate 3 so that the rest plate 19 will rest with a slight spring or resilient force against the snap pin's head once the fastening claws 6 have been forced into the lining panel 7. The resting of the end 20 of the rest plate 19 against the panel 7 provides resiliency to the rest plate 19. It also provides support when the snap pin 10 is pushed into fastening hole 16. Therefore, the head of snap pin 10 placed in aperture 8 is securely held and can be pressed in a problem-free manner into the corresponding fastening hole 16 of a body wall.

Because the wall panel 7 frequently has an irregular surface and often is not parallel to the body wall 17, and because the spacing between the panel 7 and body wall 17 may vary from sight to sight, the embodiment shown in FIGS. 1 through 4 may not provide the best fastening plate in all circumstances. Applicants have therefore designed a second embodiment shown in FIGS. 5 and 6. In the second embodiment, the rest plate 19 is not secured by the wall panel 7 but rather is resiliently held by fingers 21 and 22 which are cut out from side walls 4 and 5. Those fingers are positioned below the rest plate 19 in such a manner that they are bent inward below the end region 20 of the rest plate 19. These fingers therefore form a support for the rest plate 19 after the head 11 of the snap pin 10 is pressed between holding surface 3 and rest plate 19. The fingers in combination with the bent end 20 of the rest plate 19 provide a resiliency and support to the rest plate. The embodiment shown in FIGS. 5 and 6 offers an economic advantage in manufacture since the combination finger-end region support design can be used in most applications, regardless of variations in the shape and thickness of the panel 7.

A further embodiment of the present invention is shown in FIGS. 7 through 9. In that embodiment, the sheet metal cut to provide the aperture 8 and opening 9 is used as rest plate 19. This design eliminates the need for additional material to form the rest plate 19, thereby achieving a large saving in material when compared with the two previous embodiments. In the embodiment shown in FIG. 7, the rest plate 19 is provided with straps 27 and 28 which are also stamped out of the holding plate 3. Strap 27 remains adjoined to the side wall 4. The remaining strap 28 is free at its end 20. During the process of stamping the rest plate 19 increases in length and it has a sufficient length that it can be braced in the side wall 9 in stamped out opening 29. As shown in FIG. 8, the forward portion 30 of rest plate 19 is bent slightly away from the holding plate 3 to permit the easy insertion of the head 11 of snap pin 10.

If desired, the opening 9 in the fastening plate can be rotated 90°, as indicated in the embodiment shown in FIG. 10. That embodiment is appropriate where, for example, door-panel snap pin 10 can be inserted only in the lengthwise direction of the fastening plates because of space limitations or narrow support surfaces. In the embodiment shown in FIGS. 10 and 11, the rest plate 19 is directly connected to the side walls 4 and 5. The holding plate 3 is shaped from a strip of sheet metal joining the rest plate 19 and is bent up at edge 23 and pressed down on the rest plate 19 to produce a pouch having a gap S. A peripheral strip is bent down at the free end of the holding plate 3 at space 25, and that strip provides a blocking lug 26 which snaps in position underneath the rest plate 19, whereby securing holding plate 3 to the rest plate 19.

Other embodiments of the invention will be apparent to those skilled in the art from consideration of the specification and practice of the invention disclosed herein. It is intended that the specification and examples be considered as exemplary only, with the true scope and spirt of the invention being indicated by the following claims.

What is claimed is:

1. A fastening plate for securing to a panel a removable snap pin which includes a head and adjoining neck, the head of the snap pin having a rear face, a circumferential wall, and a circumferential shoulder integral with the snap pin's neck, comprising:
   a support plate for attachment to the panel,
   a holding plate offset from said support plate, said holding plate including an aperture larger in diameter than the neck of the snap pin and smaller in diameter than the head of the snap pin, said aperture including an opening on one side for slideably accepting the neck of the snap pin, and
   clamp means for resiliently pressing the shoulder of the snap pin against the portions of the holding plate surrounding said aperture to thereby securedly hold the snap pin perpendicular to the support plate while permitting the radial movement of the snap pin within the clearance between the neck of the snap pin and the aperture,
   said clamp means including a rest plate positioned under said aperture at a distance from said holding plate slightly less than the thickness of the snap pin's head, and said rest plate including a free end aligned with said opening, the distal portion of said free end being bent toward said support plate and ending just short of the extended plane of said support plate.

2. The fastening plate of claim 1 further comprising a plurality of claws stamped out of the support plate and bent at approximately right angles to the support plate for anchoring the support plate to the panel.

3. The fastening plate of claim 2 wherein said support plate, said holding plate, and said rest plate are formed from a single piece of sheet metal.

4. A fastening plate for securing to a panel a removable snap pin which includes a head and adjoining neck, the head of the snap pin having a rear face, a circumferential wall, and a circumferential shoulder integral with the snap pin's neck, comprising:
   a support plate for attachment to the panel,
   a holding plate offset from said support plate, said holding plate including an aperture larger in diameter than the neck of the snap pin and smaller in diameter than the head of the snap pin, said aperture including an opening on one side for slideably accepting the neck of the snap pin,
   a side wall connecting the support plate with the holding plate, and
   clamp means for resiliently pressing the shoulder of the snap pin against the portions of the of the holding plate surrounding said aperture to thereby securedly hold the snap pin perpendicular to the support plate while permitting the radial movement of the snap pin within the clearance between the neck of the snap pin and the aperture,
   said clamp means including a rest plate positioned under said aperture at a distance from said holding plate slightly less than the thickness of the snap pin's head, said rest plate including a free end aligned with said opening of said aperture, and a finger cut out from said side wall and bent below the free end of said rest plate to support said rest plate.

5. The fastening plate of claim 4 wherein said rest plate is fixed at one end to said holding plate and is bent under said holding plate to form a pouch having an open end aligned with the opening of said aperture.

6. A fastening plate for securing to a panel a removable snap pin which includes a head and adjoining neck, the head of the snap pin having a rear face, a circumferential wall, and a circumferential shoulder integral with the snap pin's neck, comprising:
   a pair of support plates for attachment to the panel,
   a holding plate offset from said support plate, said holding plate including an aperture larger in diameter than the neck of the snap pin and smaller in diameter than the head of the snap pin, said aperture including an opening on one side for slideably accepting the neck of the snap pin,
   a pair of side walls connecting the support plates to said holding plate, said
   clamp means for resiliently pressing the shoulder of the snap pin against the portions of the holding plate surrounding said aperture to thereby securedly hold the snap pin perpendicular to the support plate while permitting the radial movement of the snap pin within the clearance between the neck of the snap pin and the aperture,
   said clamp means including a rest plate positioned under said aperture at a distance from said holding plate slightly less than the thickness of the snap pin's head and said rest plate including a pair of straps, one strap being fixed to one side wall and the other strap being fit within a slot cut out in the opposite side wall.

7. The fastening plate of claim 6 wherein said fastening plate is made from sheet metal and wherein said rest plate is formed from the portion of the sheet metal cut to form said aperture.

8. A fastening plate for securing to a panel a removable snap pin which includes a head and adjoining neck, the head of the snap pin having a rear face, a circumferential wall, and a circumferential shoulder integral with the snap pin's neck, comprising:
- a pair of support plates for attachment to the panel,
- a rest plate,
- a pair of side walls connecting the support plates to said rest plate,
- a holding plate bent up from a side of said rest plate, formed over said rest plate, and offset from said support plate, said holding plate including an aperture larger in diameter than the neck of the snap pin and smaller in diameter than the head of the snap pin, said aperture including an opening on one side for slideably accepting the neck of the snap pin, and
- clamp means for resiliently pressing the shoulder of the snap pin against the portions of the holding plate surrounding said aperture to thereby securedly hold the snap pin perpendicular to the support plate while permitting the radial movement of the snap pin within the clearance between the neck of the snap pin and the aperture,
- said clamp means including said rest plate being positioned under said aperture at a distance from said holding plate slightly less than the thickness of said pin's head and further including a finger, cut out from the distal end of said holding plate, which snaps into position beneath a portion of said rest plate.

* * * * *